(12) United States Patent
Furusako et al.

(10) Patent No.: US 9,649,725 B2
(45) Date of Patent: May 16, 2017

(54) LASER WELDING METHOD

(75) Inventors: Seiji Furusako, Tokyo (JP); Yasunobu Miyazaki, Tokyo (JP); Yasuaki Naito, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 1037 days.

(21) Appl. No.: 13/823,939

(22) PCT Filed: Oct. 12, 2011

(86) PCT No.: PCT/JP2011/073360
§ 371 (c)(1),
(2), (4) Date: Mar. 15, 2013

(87) PCT Pub. No.: WO2012/050097
PCT Pub. Date: Apr. 19, 2012

(65) Prior Publication Data
US 2013/0168371 A1 Jul. 4, 2013

(30) Foreign Application Priority Data

Oct. 12, 2010 (JP) .................................. 2010-229574
Aug. 24, 2011 (JP) .................................. 2011-182927

(51) Int. Cl.
*B23K 26/00* (2014.01)
*B23K 26/20* (2014.01)
(Continued)

(52) U.S. Cl.
CPC ............ *B23K 26/20* (2013.01); *B23K 26/082* (2015.10); *B23K 26/22* (2013.01); *B23K 26/244* (2015.10);
(Continued)

(58) Field of Classification Search
CPC .. B23K 26/067; B23K 26/0673; B23K 26/24; B23K 26/244; B23K 26/26; B23K 26/28; B23K 26/32; B23K 2203/04
See application file for complete search history.

(56) References Cited

FOREIGN PATENT DOCUMENTS

JP   2009-000721   10/1983
JP   2003-014285   1/2003
(Continued)

OTHER PUBLICATIONS

Office Action dated Apr. 9, 2014 issued in corresponding Korean Application No. 10-2013-7008662 [With English Summary].
(Continued)

*Primary Examiner* — Dana Ross
*Assistant Examiner* — Brandon Harvey
(74) *Attorney, Agent, or Firm* — Birch, Stewart, Kolasch & Birch, LLP

(57) ABSTRACT

At a plurality of welding positions in an overlap portion of a plurality of members including a high-tensile steel sheet whose carbon content is 0.07 weight % or more, first beads (31 to 36) in a closed loop shape or a closed loop-like shape and second beads (41 to 46) in a closed loop shape or a closed loop-like shape on inner sides of the first bead (31 to 36) are formed by remote laser welding for joining. At this time, there are a procedure for successively forming the plural first beads (31 to 36) and a procedure for successively forming the plural second beads (41 to 46) for the plural formed first beads (31 to 36), and in both of the cases, the beads are each formed at a position except the closest welding position among the plural welding positions. Consequently, it is possible to enhance strength of a weld zone and to suppress welding deformation.

4 Claims, 11 Drawing Sheets

(51) Int. Cl.
  *B23K 26/22* (2006.01)
  *C22C 38/04* (2006.01)
  *C22C 38/02* (2006.01)
  *B23K 35/00* (2006.01)
  *B23K 35/30* (2006.01)
  *B23K 26/082* (2014.01)
  *B23K 26/32* (2014.01)
  *B23K 26/244* (2014.01)
  *B23K 103/04* (2006.01)
  *B23K 103/00* (2006.01)
  *B23K 101/00* (2006.01)

(52) U.S. Cl.
  CPC ............ *B23K 26/32* (2013.01); *B23K 35/004* (2013.01); *B23K 35/3073* (2013.01); *C22C 38/02* (2013.01); *C22C 38/04* (2013.01); *B23K 2201/006* (2013.01); *B23K 2203/04* (2013.01); *B23K 2203/50* (2015.10)

(56) References Cited

FOREIGN PATENT DOCUMENTS

| | | |
|---|---|---|
| JP | 2003-145285 | 5/2003 |
| JP | 2006-346935 | 12/2006 |
| JP | 2007-229752 | 9/2007 |
| JP | 2009-255134 | 11/2009 |
| JP | 2010-012504 | 1/2010 |
| JP | 2010012504 A * | 1/2010 |

OTHER PUBLICATIONS

Office Action dated Nov. 19, 2013 issued in corresponding Taiwanese Application No. 100136946 [With English Summary].
International Preliminary Report on Patentability dated May 16, 2013 issued in corresponding PCT Application No. PCT/JP2011/073360.
International Search Report dated Jan. 17, 2012, issued in corresponding PCT Application No. PCT/JP2011/073360.

* cited by examiner

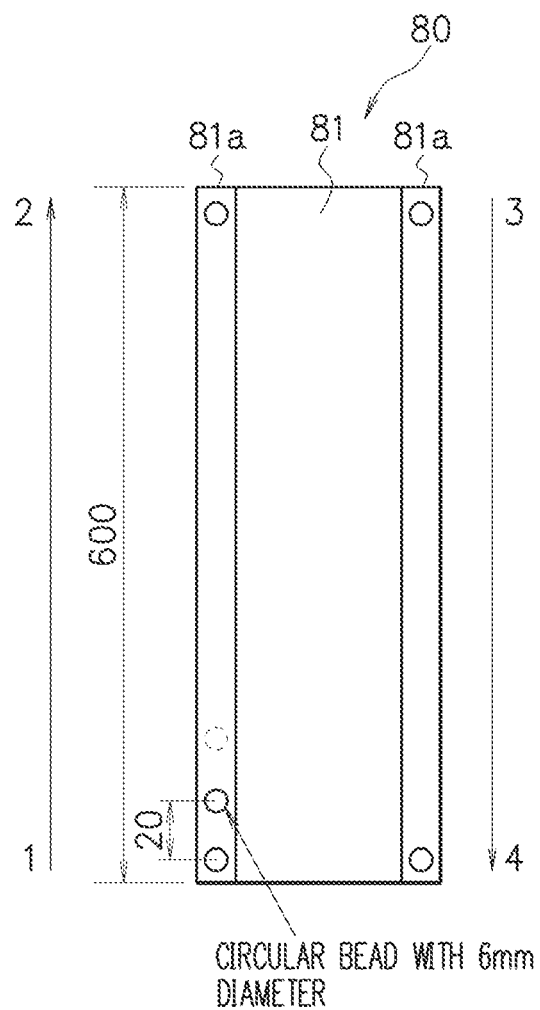

LASER WELDING METHOD

This application is a national stage application of International Application No. PCT/JP2011/073360, filed Oct. 12, 2011, which claims priority to Japanese Application Nos. 2010-229574, filed Oct. 12, 2010, and 2011-182927, filed Aug. 24, 2011, the contents of which are incorporated by reference herein in their entirety.

TECHNICAL FIELD

The present invention relates to a laser welding method suitably used for laser-welding a plurality of stacked members including a high-tensile steel sheet.

BACKGROUND ART

In recent years, in order to meet a demand for enhancement of fuel efficiency and improvement of safety in automobiles, high-strength thin steel sheets have come to be used for automobile bodies, and it is required to weld these steel sheets by using laser welding. Further, in a method of welding the high-strength stacked thin steel sheets, a laser welding method with which stable strength of joint portions can be obtained is desired.

The laser welding uses a laser beam as a heat source and therefore can surely and easily control an input heat amount as compared with arc welding such as TIG welding and MIG welding. Accordingly, it is possible to reduce thermal deformation by appropriately setting welding conditions such as a welding speed and radiation output of the laser beam and further a flow rate of shielding gas and so on. Further, the laser welding is capable of welding from one side and thus is suitable for assembly welding of complicated members such as automobile bodies.

Actually, the laser welding is often adopted for welding members molded from thin steel sheets in the automobile manufacturing industry, the electric equipment manufacturing industry, and other fields. Further, relating to this, there has been proposed a laser welding method of a lap joint excellent in weld joint strength.

Patent Literature 1, for instance, discloses a method which realizes quality improvement by tempering a first bead by heat of a second bead to prevent the beads from being easily fractured at the time of the molding, thereby improving moldability.

CITATION LIST

Patent Literature

Patent Literature 1: Japanese Laid-open Patent Publication No. 2009-000721

SUMMARY OF INVENTION

Technical Problem

In accordance with an increase in strength of steel sheets, to improve strength of a weld zone has become an issue. Especially, in lap welding of high-tensile steel sheets whose tensile strength is 780 MPa or more and whose carbon content is 0.07 mass % or more, strength of the weld zone is sometimes insufficient in conventional arts.

The present inventors have studiously studied a laser welding method for enhancing strength of a weld zone. As a result, it has been found out that in welding where a plurality of beads are formed, by appropriately forming the beads and making average Vickers hardness of the first bead lower than average Vickers hardness of the second and subsequent beads, it is possible to obtain a laser-welded joint excellent in joint strength.

It is an object of the present invention to make it possible to enhance strength of a weld zone and suppress welding deformation.

Solution to Problem

A laser welding method of the present invention is a laser welding method in which at a plurality of welding positions in an overlap portion of a plurality of members including a high-tensile steel sheet whose carbon content is 0.07 weight % or more, first beads in a closed loop shape or a closed loop-like shape and second beads in a closed loop shape or a closed loop-like shape on inner sides of the first beads are formed by remote laser welding for joining, the method including: a procedure for successively forming the plural first beads at all or part of the plural welding positions; and a procedure for successively forming the plural second beads for the plural formed first beads, wherein, in both of the cases of the procedure for successively forming the plural first beads and the procedure for successively forming the plural second beads, the beads are each formed at a position except the closest welding position among the plural welding positions.

Further, another characteristic of the laser welding method of the present invention is that, in the procedure for successively forming the plural second beads, the second beads are each formed for the first bead whose maximum temperature has become equal to or lower than an Ms point−50° C.

Further, another characteristic of the laser welding method of the present invention is that, in the procedure for successively forming the plural second beads, the second beads are each formed so that a temperature of the first bead becomes not lower than 400 degrees centigrade nor higher than an Ac1 point+50° C.

Further, another characteristic of the laser welding method of the present invention is that the first beads each have a circular shape and the second beads each have a circular shape concentric with the first bead; and an angle made by a line connecting a center of the beads and starting and terminating ends of the first bead and a line connecting the center and starting and terminating ends of the second bead is 10° or more.

Advantageous Effects of Invention

According to the present invention, it is possible to enhance strength of a weld zone and to suppress welding deformation.

BRIEF DESCRIPTION OF DRAWINGS

FIG. 8B is a plane view showing the one-sided hat member of the example 2.

DESCRIPTION OF EMBODIMENTS

Hereinafter, suitable embodiments of the present invention will be described with reference to the attached drawings. Note that in the below, where "%" is simply written, it represents "mass %".

(First Embodiment)

Figure 1:
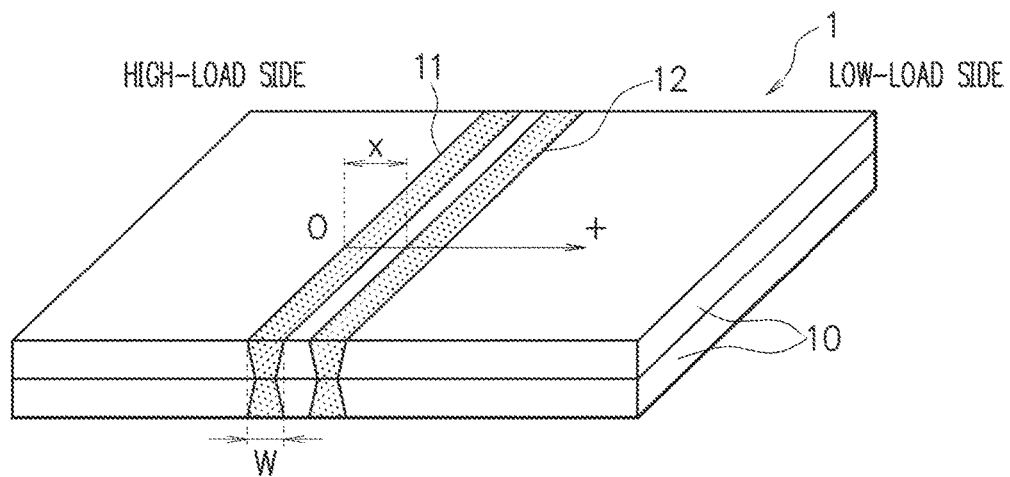
FIG. 1 is an explanatory view of an outline of a laser-welded joint according to an embodiment.

A laser-welded joint 1 according to this embodiment is composed of a plurality of stacked high-tensile steel sheets 10 which are joined. Generally, about two to four high-tensile sheets are stacked and joined, but the number of the high-tensile sheets is not limited. FIG. 1 is an example where two high-tensile sheets are stacked.

As the high-tensile steel sheets 10, steel sheets whose carbon content is 0.07% or more are used, and when having a 0.07% carbon content or more, they have high hardenability to harden in a wide heat input range and have high hardness when quenched. As a result, it is difficult to ensure joint strength, especially, strength against a load in an exfoliation direction.

The present invention is an art to manufacture a weld joint having sufficient strength even when such high-tensile steel sheets are welded, and its target is a high-tensile steel sheet whose carbon content is 0.07% or more. "An overlap portion of a plurality of members including a high-tensile steel sheet" includes a case where a soft steel sheet is stacked on a further outer side of the overlap portion of the high-tensile steel sheet so that the overlap portion is formed by the soft steel sheet+the high-tensile steel sheet+the high-tensile steel sheet or by the soft steel sheet+the high-tensile steel sheet+ the high-tensile steel sheet+the soft steel sheet, and this case is also a target of the present invention. Further, a case where the overlap portion is formed by the soft steel sheet+the high-tensile steel sheet is also included, and this case is also a target of the present invention.

The weld zone of the weld joint is composed of a plurality of beads. Here, let an arbitrary point on a toe on a side receiving a higher stress at the time of load application among toes of the first bead 11 on a steel sheet surface be an origin O and let a direction of a toe on a side receiving a lower stress at the time of the load application and closest to the origin among the toes of the first bead 11 on the steel sheet surface be a positive direction when seen from the origin O, the second and subsequent beads are formed more on the positive direction side than the first bead.

A position x of a toe closer to the origin, of the second and subsequent beads is located within a range of $0 \leq x \leq 1.2\,W$, where W is an average bead width of the first bead in a sheet thickness direction. FIG. 1 shows only the second bead 12.

The first bead is tempered by heat when the second bead is formed. When a load is applied to the weld zone, a stress concentrates especially on the vicinity of a place where a weld line of the first bead and an overlap portion of the steel sheets intersect with each other, which is likely to cause a fracture.

In the weld joint according to this embodiment, tempering the first bead improves ductility of a bead bond section and also can alleviate the stress concentration on the overlap portion at the time of the load application, leading to enhanced resistance against the load application. Therefore, the second bead is formed more on the side receiving a lower stress at the time of the load application than the first bead.

If x is 0 or less, a temperature of the toe, of the first bead, on the side receiving a higher stress and the overlap portion becomes an Ac3 point or higher at the time of the formation of the second and subsequent beads, and because quenching is done again, joint strength does not improve. If x is larger than 1.2 W, heat when the second and subsequent beads are formed is not transferred to the first bead sufficiently, and thus the first bead cannot be tempered and the joint strength is not improved.

Forming the beads in such a positional relation makes it possible to obtain a laser-welded joint excellent in joint strength, with average Vickers hardness of the first bead being lower than average Vickers hardness of the second and subsequent beads.

Increasing a joint area by increasing the number of the beads to 3, 4, or the like can enhance shear strength as well. At this time, the third bead is formed at the same position as that of the second bead or at a position more on the plus side than the second bead, and the fourth bead is formed at the same position as that of the third bead or at a position more on the plus side than the third bead.

If the third and fourth beads are formed at the same position as that of the second bead, the tempering of the first bead further progresses and a load in the exfoliation direction can be improved. However, since the joint area changes little, the shear strength does not improve.

On the other hand, when the third bead is formed more on the plus side than the second bead, or when the fourth bead is formed more on the plus side than the third bead, it is possible to achieve the tempering of the first bead and an increase in the joint area, enabling improvement both in the strength in the exfoliation direction and the strength in a shear direction.

In the laser-welded joint according to this embodiment, the beads have a substantially linear shape in the sheet thickness direction. Incidentally, under the condition that the bead shape is substantially linear in the sheet thickness direction, a width of the bead surface that can be confirmed on the steel sheet surface or an average width of bead front and rear surfaces that can be confirmed on front and rear surfaces of the steel sheet may be regarded as a typical bead width, instead of the average bead width W.

Figure 2A:
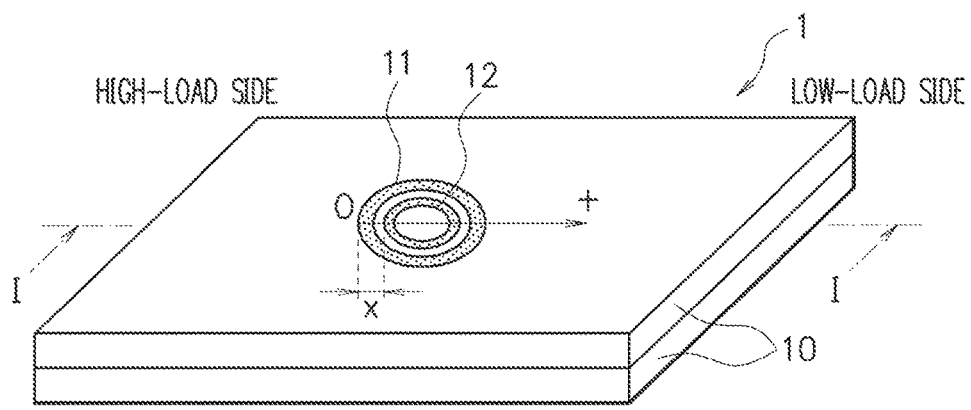
FIG. 2A is an explanatory perspective view of an outline of another example of the laser-welded joint according to the embodiment.
Figure 2B:
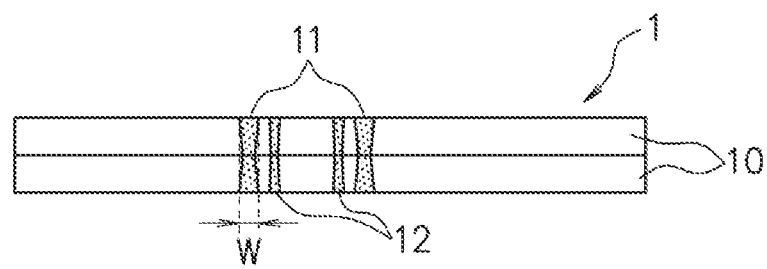
FIG. 2B is a cross-sectional view taken along the I-I line in FIG. 2A.
Figure 3A:
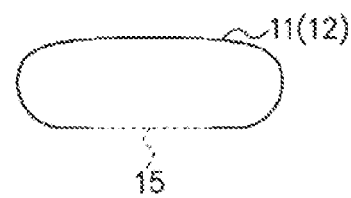
FIG. 3A is a view showing an example of a closed loop-like bead shape.
Figure 3B:
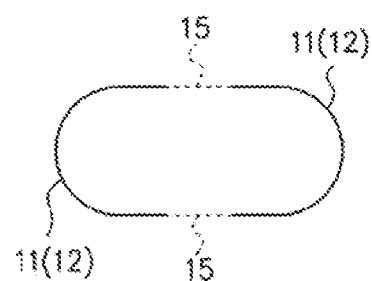
FIG. 3B is a view showing an example of the closed loop-like bead shape.
Figure 3C:
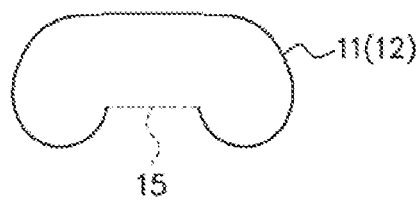
FIG. 3C is a view showing an example of the closed loop-like bead shape.
Figure 3D:
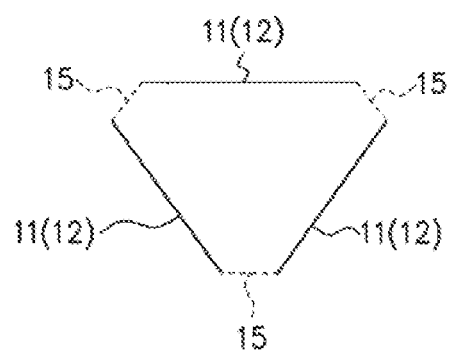
FIG. 3D is a view showing an example of the closed loop-like bead shape.
Figure 3E:
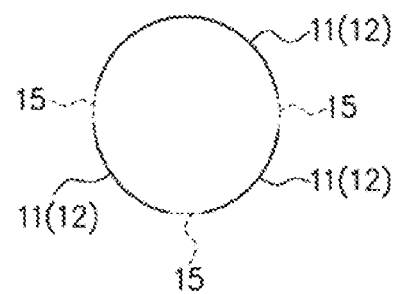
FIG. 3E is a view showing an example of the closed loop-like bead shape.

The weld line of the laser-welded joint may be linear, but when it is in a closed loop shape or in a closed loop-like shape, stress concentration on starting and terminating ends can be alleviated, which makes it possible to further improve the joint strength. FIG. 2A and FIG. 2B show an outline of a laser-welded joint fabricated with a closed loop where starting and terminating ends overlap.

The closed loop refers to a shape where starting and terminating ends of a circle, an ellipse, or the like overlap and also includes a shape partly having a curve with a different curvature and shapes such as a triangle, a quadrangle, and the like.

The closed loop-like shape refers to a shape which has one opening portion 15 or more where the bead 11 (or 12) is not formed and in which the total length of the opening portions 15 is ¾ of a circumcircle-equivalent diameter of the bead 11 or less as shown in FIG. 3A to FIG. 3E, for instance. FIG. 3A to FIG. 3E show examples of a bead shape having the opening portion(s) 15, the solid line representing the bead 11 (or 12) and the broken line representing the opening portion 15. The bead shapes shown in FIG. 3A to FIG. 3E are examples and the closed loop-like bead shape is not limited to these.

The closed loop-like bead shape having the opening portion is effective for, for example, the welding of stacked galvanized steel sheets, and the like. In the case of the welding of the galvanized steel sheets or the like, when plating between the steel sheets reaches a boiling point to evaporate and its volume rapidly increases, a pressure between the steel sheets increases to blow away a molten pool during the welding and a flaw occurs in the bead unless there is a path of the plating which has turned into vapor or gas in an area surrounded by the bead. Forming the bead in the closed loop-like shape having the opening portion can prevent this.

As the laser-welded joint, a high-tensile steel sheet whose sheet thickness is within a range of 0.5 to 3.0 mm is suitably used. Even when the sheet thickness is less than 0.5 mm, a strength improvement effect of the weld zone can be obtained, but since the strength of the joint is governed by the sheet thickness, a strength improvement effect of the entire joint becomes small and an application range of the member is limited. Further, even when the sheet thickness is over 3.0 mm, the strength improvement effect of the weld zone can be obtained, but in view of weight reduction of the member, an application range of the member is limited.

Next, a laser welding method according to this embodiment will be described. As an apparatus used for manufacturing the laser-welded joint, the same one as a conventional apparatus for manufacturing a laser-welded joint is usable.

In the manufacture of the laser-welded joint, after the first bead is formed by laser welding, it is waited for the temperature of the first bead to reach equal to or lower than an Ms point−50° C. (Ms point: martensite transformation starting temperature), and thereafter, the formation of the second and subsequent beads is started.

Setting the temperature of the first bead equal to or lower than the Ms point−50° C. causes the generation of a certain amount or more of martensite in the steel sheets. Thereafter, due to the heating for forming the second bead, the aforesaid martensite is softened by tempering, leading to an increase in the joint strength.

If the formation of the second and subsequent beads is started while the temperature of the first bead is higher than the Ms point−50° C., the martensite is not sufficiently generated and accordingly a volume of the martensite tempered by the formation of the second bead is limited, and residual austenite transforms into martensite in a cooling process after the formation of the second bead and is hardened, resulting in an insufficient effect of the tempering.

In order to lower the hardness of a bead, it is preferable to lower a cooling speed to precipitate a soft texture such as bainite and perlite, but this is difficult to realize by laser welding having a sufficiently high cooling speed.

A lower limit of the temperature of the first bead when the formation of the second and subsequent beads is started is not particularly limited, but is preferably equal to or higher than the Ms point—250° C. This is because an ordinary steel sheet finishes its martensite transformation at the Ms point−250° C. Waiting until the temperature becomes lower than the Ms point−250° C. does not have any special merit and increases tact time, resulting in an increase in production cost.

As the temperature of the bead, a temperature measured on a toe on the steel sheet surface on the side receiving a higher stress at the time of the load application can be used as a typical value. Incidentally, the temperature can be measured by using a radiation thermometer or a thermocouple. Alternatively, when the direct measurement is difficult, the temperature can be estimated by finite element analysis software available on the market such as Quickwelder. Further, it is possible to estimate the Ms point from components of the steel sheets by the following expression.

$$Ms(°C.)=550-361\times(\%C)-39\times(\%Mn)-35\times(\%V)$$

$$-20\times(\%Cr)-17\times(\%Ni)-10\times(\%Cu)$$

$$-5\times(\%Mo+\%W)+15\times(\%Co)+30\times(\%Al)$$

(%C) and the like are values representing the contents of the elements in the steel sheet in mass %.

Further, after the first bead is formed, the second and subsequent beads are formed under a condition capable of heating so that a reheating temperature of the first bead becomes not lower than 400° C. nor higher than the Ac1 point+50° C. As described above, the temperature of the bead can be directly measured by the thermocouple or the radiation thermometer or can be estimated by the finite element analysis software. Therefore, the second and subsequent beads can be formed at a target temperature range.

If an average temperature of the first bead is lower than 400° C. when the second and subsequent beads are formed, the first bead is not sufficiently tempered and is not softened, and accordingly sufficient joint strength cannot be obtained. If the temperature of the first bead is over the Ac1 point° C.+50° C., a ratio of austenite generated in the texture in the first bead increases, the martensite transformation occurs due to re-quenching during the cooling, so that softening does not take place, and therefore sufficient joint strength cannot be obtained. A more preferable temperature range is equal to or higher than 400° C. and lower than the Ac1 point.

The Ac1 point can be estimated from the components of the steel sheet by:

$$Ac1(° C.) = 723 - 10.7 \times (\% \text{ Mn}) - 16.9 \times (\% \text{ Ni}) +$$
$$29.1 \times (\% \text{ Si}) + 16.9 \times (\% \text{ Cr}) + 290 \times (\% \text{ As}) + 6.38 \times (\% \text{ W}).$$

(%C) and so on are values representing the contents of the elements in the steel sheet in mass %.

Further, in the manufacture of the laser-welded joint, as x/W is smaller, it is necessary to increase v2/v1, that is, a ratio of a welding speed v1 when the first bead is formed by welding and a welding speed v2 when the second and subsequent beads are formed by welding, thereby suppressing a heat transfer amount to the first bead. When x/W is large, it is necessary to reduce v2/v1 to increase the heat transfer amount to the first bead.

When v2/v1 becomes small, the maximum temperature of the first bead becomes beyond the Ac1 point and re-quenching occurs to increase the hardness, and thus the joint strength does not become high. Further, when v2/v1 is extremely small, heat input becomes too large and burn-through of the bead sometimes occurs.

When v2/v1 becomes large, the maximum temperature of the first bead becomes low and there is a tendency that the softening by tempering is not possible and thus the joint strength does not become high.

An optimum range of v2/v1 depends on x/W, and as a result of studies by the present inventor, good joint strength is obtained when this is within a range of $1.2/\exp(x/W) \leq v2/v1 \leq 4/\exp(x/W)$.

A power density of laser is preferably not less than 0.5 MW/cm$^2$ nor more than 500 MW/cm$^2$. When the power density is not less than 0.5 MW/cm$^2$ nor more than 500 MW/cm$^2$, the tempering of the bead is possible at a wide welding speed range.

When the power density is lower than 0.5 MW/cm$^2$, the tempering of the bead cannot be realized unless a moving speed of a laser beam, that is, the welding speed is greatly lowered, which is disadvantageous in actual production. On the other hand, when the power density is higher than 500 MW/cm$^2$, it is necessary to extremely increase the moving speed of the beam in order to temper the bead at a predetermined temperature or lower, which limits facility ability and makes it difficult to stably obtain the effect of the tempering.

Incidentally, it is possible to calculate the power density of the laser beam by dividing an output of the laser beam by a beam area, and further it is possible to find the beam area by using a beam radius (a distance from a center of the beam to a point where intensity reduces to $1/e^2$ of intensity of the center of the beam (radius)).

When the bead shape is the closed loop and the starting end and the terminating end overlap, heat of the starting end is superimposed on the terminating end, resulting in overheating, which sometimes causes the molten steel to drop or blow off. Further, if the first bead is put close to positions of the starting and terminating ends of the second and subsequent beads, the second and subsequent beads sometimes further promote the dropping and blowing of the molten steel.

The occurrence of the dropping of the molten steel and the like leads to deterioration of the joint strength. Therefore, in order to suppress this, the positions of the starting and terminating ends of the first bead are preferably deviated from those of the second and subsequent beads.

For example, when the first bead is circular and the second bead has a circular shape concentric with the first bead, the beads are preferably formed so that an angle made by a line connecting the center of the beads and the starting and terminating ends of the first bead and a line connecting the center of the beads and the starting and terminating ends of the second and subsequent beads becomes 10° or more.

(Second Embodiment)

Figure 4A:
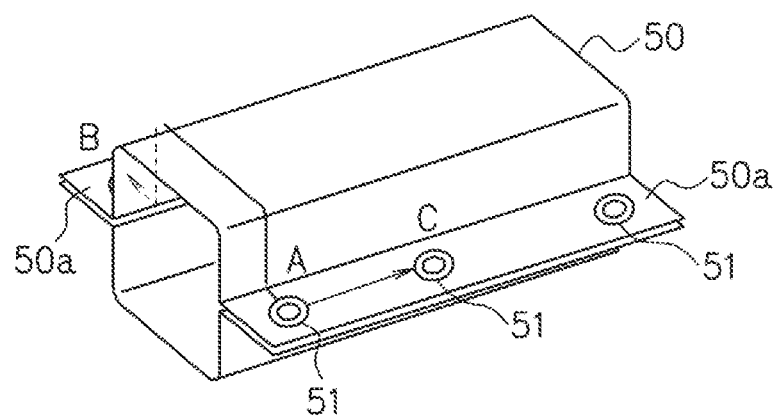
FIG. 4A is a perspective view showing an example of a structure member in which weld zones each including a plurality of beads are formed at a plurality of welding positions.
Figure 4B:
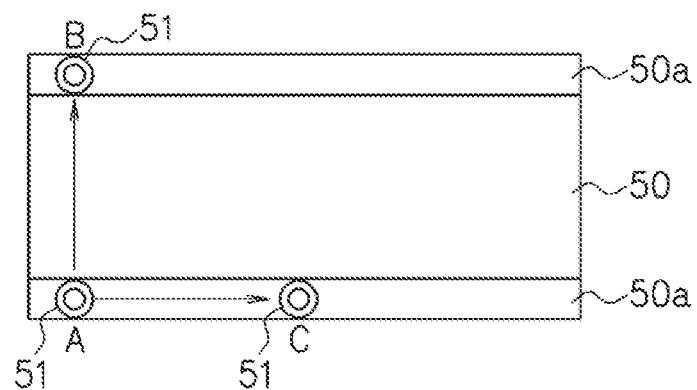
FIG. 4B is a plane view showing the example of the structure member in which the weld zones each including the plural beads are formed at the plural welding positions.

In the above-described first embodiment, the structure of the weld zone composed of the plural beads is described. The second embodiment describes an example, as its application example, where at a plurality of welding positions in an overlap portion of a plurality of members including a high-tensile steel sheet whose carbon content is 0.07 weight % or more, first beads in a closed loop shape or a closed loop-like shape and second beads in a closed loop shape or a closed loop-like shape on inner sides of the first beads are formed by remote laser welding for joining. In structure members which are large as compared with the beads formed in the closed loop shape or the closed loop-like shape, in order to improve joining strength (exfoliation strength or shear strength) of the members, weld zones 51 each composed of the plural beads are sometimes formed at a plurality of welding positions of the structure members 50 as shown in FIG. 4A and FIG. 4B.

In welding such members, in a method of fixing welding places sequentially one by one in such a manner that after the formation of the first bead and the waiting until the temperature of the first bead becomes equal to or lower than the Ms point–50° C., the second and subsequent beads are formed, and thereafter the next first bead is formed, the total welding time becomes long and the tact time increases.

Figure 6A:
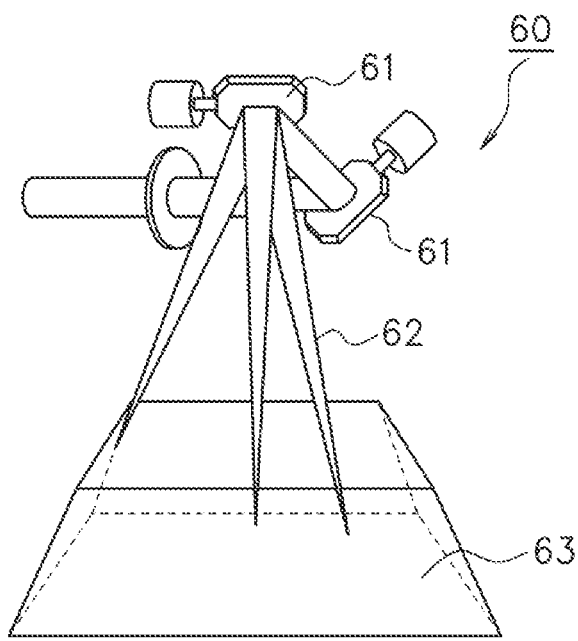
FIG. 6A is a conceptual view showing a remote laser welding system whose laser spot position can be moved at a high speed and is a view showing a light collecting optical system.
Figure 6B:
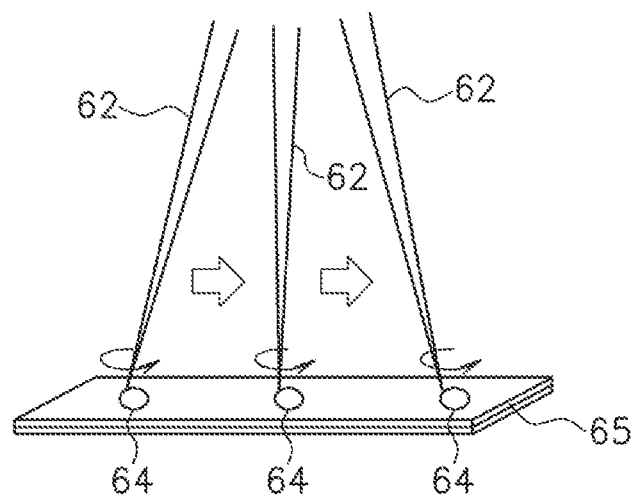
FIG. 6B is a conceptual view showing the remote laser welding system whose laser spot position can be moved at a high speed and is a view showing how the laser spot position moves.

In order to avoid this, when the plural beads are formed, the first beads are formed successively at a plurality of welding positions by using mirrors 61 in a light collecting optical system 60 as shown in FIG. 6A and FIG. 6B and using remote laser welding requiring a very short time for the movement of a spot position of laser, whereby a waiting time until the second bead is formed can be effectively used. Note that in the drawings, the reference sign 62 denotes a laser beam, the reference sign 63 denotes a laser radiatable area, 64 denotes the beads, and 65 denotes a high-tensile steel sheet.

Thereafter, when the second bead is formed by the remote laser welding for a bead whose maximum point has become equal to or lower than the Ms point–50° C. among the first beads, the waiting time during which no radiation of the laser takes place becomes short, and as a result, the total welding time reduces.

The welding order of the second beads only needs to be an order so that welding deformation becomes small and the order is not particularly limited. The welding order so as to reduce the welding deformation can be easily analyzed by using a finite element method.

Further, forming the plural beads by the above-described method makes it possible to fix the members before the welding deformation starts due to the occurrence of a residual stress or before the welding deformation ends, since the first beads are formed at the plural places in a short time. As a result, it is possible to minimize the deformation of the structure members after the welding and improve shape accuracy.

In forming the third beads, the third beads may be formed for the second beads in the same manner as in the formation of the second beads for the first beads. Forming the fourth and subsequent beads in the same manner can shorten the total welding time and suppress the welding deformation.

Figure 5:
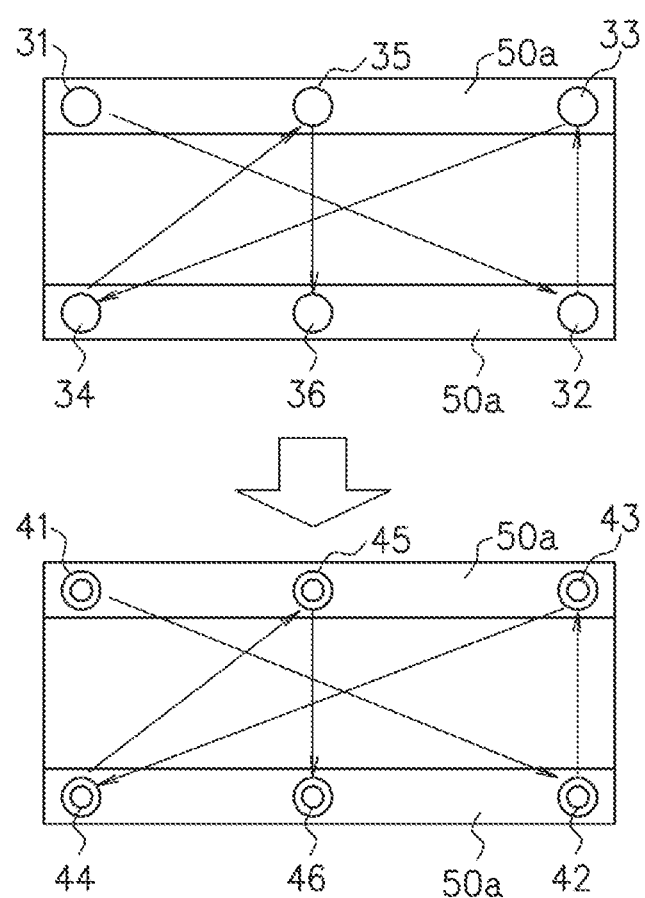
FIG. 5 is a view showing an example of a procedure for forming weld zones each including a plurality of beads at a plurality of welding positions of flange portions of a hat member by remote laser welding.

FIG. 5 is a view showing an example of a procedure for forming weld zones each composed of a plurality of beads by remote laser welding at a plurality of welding positions of flange portions 50a of a hat member. First, first beads 31 to 36 in a closed loop shape or a closed loop-like shape are successively formed in order of the number. Then, after the maximum point of the first beads becomes equal to or lower than the Ms point−50° C., second beads 41 to 46 in a closed loop shape or a closed loop-like shape are successively formed on inner sides of the respective first beads 31 to 36 in order of the number. Here, successively means that the operation of "bead formation→movement to another welding position→bead formation . . . " is performed as a series of operations and does not mean that the laser is continuously radiated without interruption. Rather, at the time of the movement to another welding position, it is necessary to stop the radiation of the laser so as not to give heat input to an unnecessary place of the member.

When the procedure for successively forming the plural first beads and the procedure for successively forming the plural second beads for the plural first beads that have been formed are thus executed, the beads are each formed at a position except the closest welding position in both of the procedures. This can suppress the welding deformation.

Here, "the closest welding position" means a position to which a distance along the shape of the steel sheet forming the structure member 50 is the closest. A reason why the closest welding position is avoided is because heat transfer is deeply involved in the welding deformation and the position to which the distance along the shape of the steel sheet, that is, the distance along which heat transfers, is the closest is avoided. For example, as shown in FIG. 4A and FIG. 4B, after the bead is formed at a welding position A, it is considered at which of welding positions B, C, the bead is to be formed. In this case, spatial distances (distances in a plane view) of A-B and A-C are equal, but since a distance along the shape of the steel sheet is shorter for A-C, C being the closest welding position is avoided.

In the example in FIG. 5, the example where the first beads are formed at all the welding positions (six places), and next the second beads are formed at all the welding positions (six places) is described, but this is not restrictive. Another possible form may be, for example, to first form the first beads at three places and next form the second beads at these three places, and thereafter form the remaining first beads at three places and then form the second beads at these three places.

Further, in linearly arranging the weld zones each composed of the plural beads as shown in FIG. 5, if an interval between the beads (gravity centers thereof) is considered in a structure member having undergone welding at many places, shear tensile strength and exfoliation strength proportional to the number of the welding places (the number of beads) can be obtained as the welded structure. Therefore, the interval is preferably a value (average value) equal to "the number enabling to obtain the strength that the structure requires" divided by "length of a flange portion". However, the interval between the welding places is preferably short partially or at a portion locally requiring strength in the member.

Forming the weld zones as described above makes it possible to manufacture a weld joint having good joint strength.

EXAMPLES

Example 1

Two high-tensile steel sheets whose sheet thickness was 1.0 mm and whose main components were C: 0.12 weight %, Si: 0.5 weight %, Mn: 2.0 weight %, P: 0.01 weight %, and S: 0.003 weight % were stacked and joined by laser welding, whereby a joint was fabricated. The shape of beads of a weld zone was circular closed loop, and two weld beads were formed.

At this time, a diameter of the weld zone was defined by a size of the first bead located on the utmost outer side, that is, a diameter of the bead on a sheet surface to which laser was radiated was measured and the diameter was defined as constant 6 mm.

An angle θ made by a line connecting a center of the beads and starting and terminating ends of the first bead and a line connecting the center and starting and terminating ends of the second bead was 0° or 15°.

From the components of the steel sheets, the Ms point and the Ac1 point are estimated to be 429° C. and 716° C. respectively.

A plurality of kinds of the laser-welded joints were fabricated, with a width of the weld bead, a bead position, and a welding temperature being varied as shown in Table 1. The welding was performed, with the other welding conditions being set such that a laser out was 3.5 kW, a focus position was on a surface of the upper steel sheet, and a diameter of a beam spot at the focus position was 0.5 mm.

Regarding the fabricated laser-welded joints, cross tensile strength and hardness of the first bead (in a cross section of the weld zone, hardness of the weld metal was measured at five points in a sheet thickness direction based on a point which is 0.1 mm apart toward the weld metal from a point where an overlap surface and a weld line intersect with each other, and the obtained values were averaged) were measured.

A method of measuring the cross tensile strength and the shape of the joint were based on JIS Z 3137 which is the definition regarding the spot-weld joint. A cross joint was fabricated by laser welding, and a tensile test was conducted under a constant tensile speed of 10 mm/min by using a predetermined tensile jig, and the maximum load at this time was defined as the cross tensile strength.

The temperature of the first bead was measured by a thermocouple pasted near a toe on a side receiving a lower stress on the surface of the steel sheet. The measured temperature was defined as a typical temperature of the first bead.

Results of these are shown in Table 1. With the cross tensile strength when only one bead was formed (No. 5) being a reference, a case where the cross tensile strength was 1.2 times or more of the reference was assessed as good, and a case where a ratio of the cross tensile strength was less than 1.2 times was assessed as defective. Note that the underlines in the table means that the conditions described in the first embodiment are not satisfied.

Figure 7:
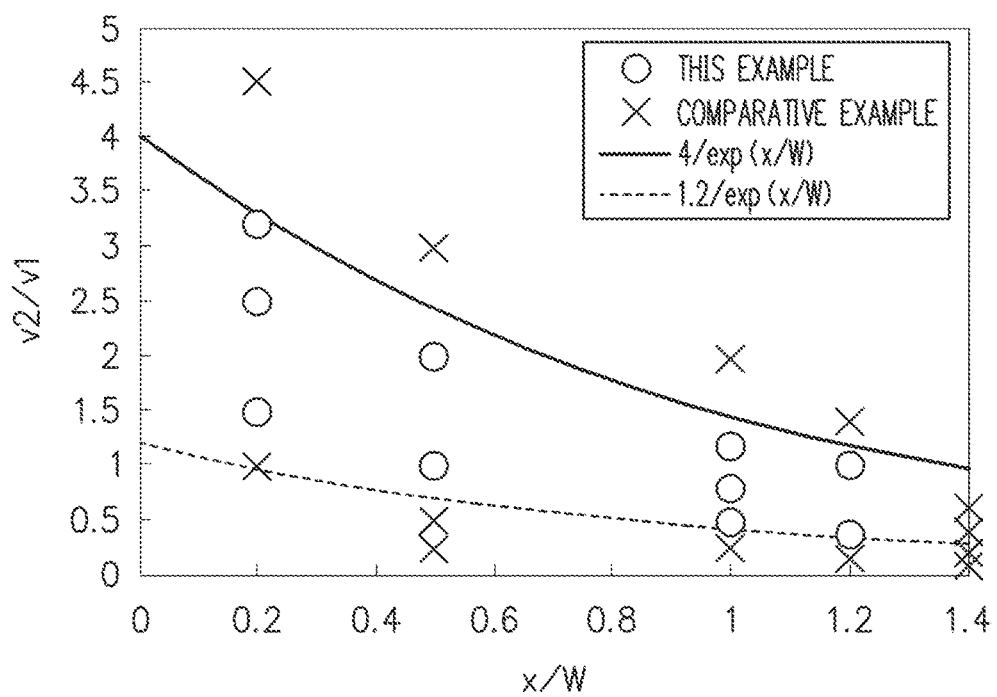
FIG. 7 is a chart showing results of an example 1.

Further, FIG. 7 shows an influence that x/W and v2/v1 have on the ratio of the cross tensile strength. In FIG. 7, ○ represents the results of this example and X represents the results of a comparative example.

When v2/v1 was in the range described in the first embodiment, good cross tensile strength was obtained. When v2/v1 was too low, the temperature of the first bead increased too much and the bead did not soften or the bead melted down. On the other hand, when v2/v1 was too high, the tempering of the first bead was insufficient and the cross tensile strength did not improve.

TABLE 1

| No. | | cross tensile strength ratio | width of first bead W (mm) | toe position of second bead x (mm) | x/W | v2/v1 | 1.2/ exp (x/W) | 4/ exp (x/W) | θ (degree) | temperature of first bead at formation start of second bead (° C.) | heating temperature of first bead at the time of formation of second bead (° C.) | hardness of first bead (Hv) | hardness of second bead (Hv) |
|---|---|---|---|---|---|---|---|---|---|---|---|---|---|
| 1 | comparative example | 1 | 0.5 | 0 | <u>0</u> | <u>1</u> | 1.2 | 4 | 0 | 200 | >1500 (melt) | 410 | 415 |
| 2 | invention example | 1.7 | 0.5 | 0.25 | 0.5 | 1 | 0.73 | 2.4 | 0 | 205 | 692 | 330 | 413 |
| 3 | invention example | 1.3 | 0.5 | 0.5 | 1 | 1 | 0.44 | 1.5 | 0 | 197 | 655 | 380 | 414 |
| 4 | comparative example | 1 | 0.5 | 0.7 | <u>1.4</u> | <u>1</u> | 0.3 | 0.99 | 0 | 201 | 320 | 399 | 415 |
| 5 | comparative example | 1 | 0.5 | — | — | — | — | — | 0 | — | — | 415 | — |
| 6 | comparative example | 1 | 0.5 | 0.25 | 0.5 | 1 | 0.73 | 2.4 | 0 | <u>400</u> | <u>860</u> | 403 | 415 |
| 7 | comparative example | 1 | 0.5 | 0.25 | 0.5 | <u>2.5</u> | 0.73 | 2.4 | 0 | 203 | <u>970</u> | 415 | 418 |
| 8 | invention example | 1.8 | 0.5 | 0.25 | 0.5 | 1 | 0.73 | 2.4 | 15 | 201 | 660 | 315 | 413 |
| 9 | invention example | 2 | 0.5 | 0.25 | 0.5 | 1.5 | 0.73 | 2.4 | 0 | 195 | 690 | 320 | 420 |
| 10 | comparative example | 1 | 0.5 | 0.25 | 0.5 | <u>0.6</u> | 0.73 | 2.4 | 0 | 210 | 390 | 397 | 415 |
| 11 | comparative example | 1 | 0.5 | 0.25 | 0.5 | <u>2.6</u> | 0.73 | 2.4 | 0 | 200 | <u>1180</u> | 401 | 417 |

As is seen from the results in Table 1, it is possible to obtain a laser-welded joint excellent in joint strength.

Example 2

Figure 8A:
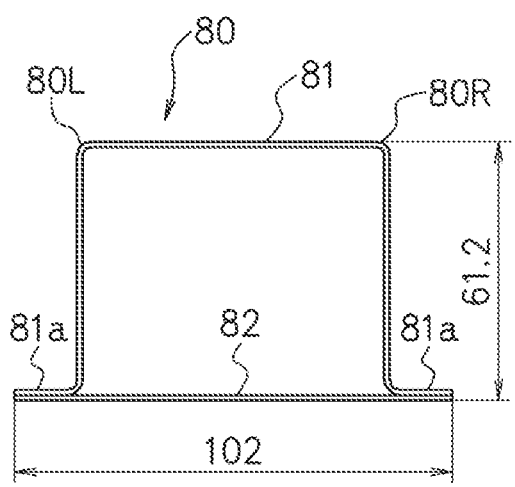
FIG. 8A is a front view showing a one-sided hat member of an example 2.

As shown in FIG. 8A and FIG. 8B, a one-sided hat member 80 was fabricated in such a manner that a flat sheet 82 was laser-welded so as to be suspended between flange portions 81*a* on both sides of a hat member 81. A height of the one-sided hat member 80 is 61.2 mm, a distance between outer end portions of the flange portions 81*a* is 102 mm, and a length of the one-sided hat member 80 (that is, a length of the flange portions 81*a*) is 600 mm. Note that high-tensile steel sheets being the hat member 81 and the flat sheet 82 whose sheet thickness was 1.2 mm and whose main components were C: 0.12 weight %, Si: 0.5 weight %, Mn: 2.0 weight %, P: 0.01 weight %, and S: 0.003 weight % were stacked and joined by laser welding.

The welding was performed under welding conditions that a laser output was 4.5 kW, a focus position was on a surface of the upper steel sheet, and a diameter of a beam spot at the focus position was 0.5 mm. As shown in FIG. 8B, circular beads with a 0.5 mm bead width and a 6 mm diameter were formed in order of 1→2→3→4, that is, they were formed in order from an end to an end of one of the flange portions 81*a* on both sides and next were formed in order from an end to an end of the other. The second beads were circular beads concentric with the first beads and had a 5.5 mm diameter, and were formed, after the formation of the first beads, in order of 1→2→3→4 similarly to the first beads. An interval between positions of the beads (gravity centers thereof) was 20 mm. In this case, a twist angle was about 20° and was to such a degree as to become a problem when this one-sided hat member 80 was assembled to another member to be welded or fixed. The twist angle refers to an angle made by a line connecting a highest height of one end portion 80R and a lowest height of another end portion 80L and a line connecting a lowest height of the one end portion 80R and a highest height of the other end portion 80L when seen in the direction shown in FIG. 8A.

On the other hand, in a similar one-sided hat member 80, both when a plurality of first beads were successively formed and when a plurality of second beads were successively formed, the beads were each formed at a position except the closest welding position. In this case, welding deformation was suppressed and the twist angle was reduced to less than 1°, and improvement was made to such accuracy as to cause no problem when this one-sided hat member 80 was assembled to another member to be welded or fixed.

Example 3

Figure 9:
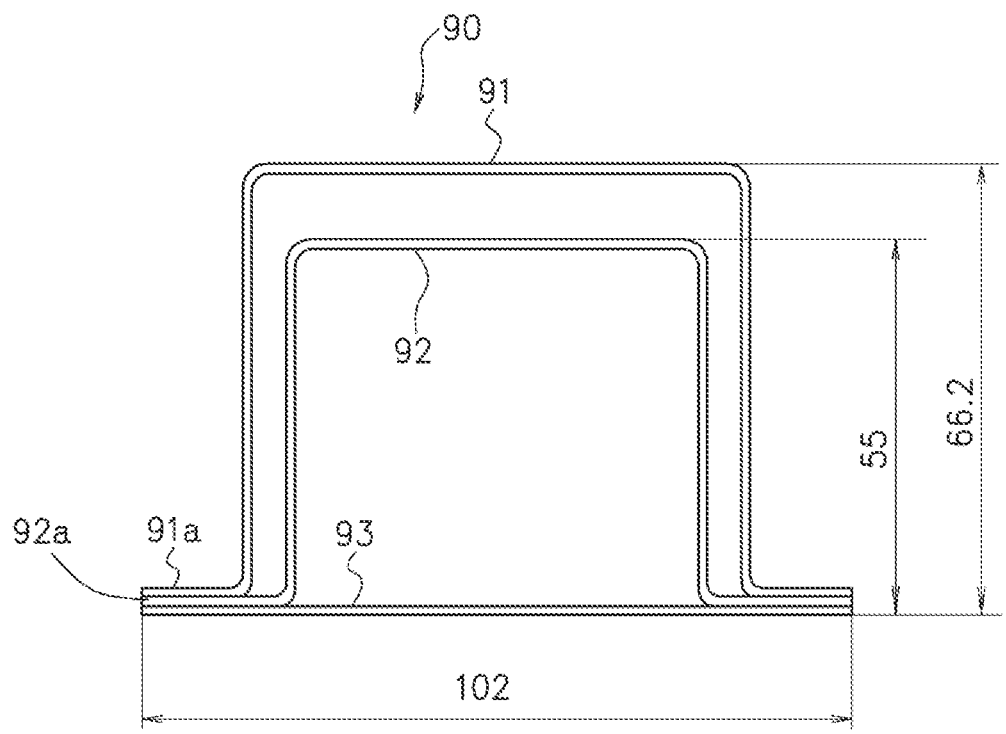
FIG. 9 is a front view showing a one-sided hat member of an example 3.

As shown in FIG. 9, a one-sided hat member 90 whose flange portions were composed of three stacked steel sheets was fabricated in such a manner that a flat sheet 93 being a high-tensile steel sheet was laser-welded so as to be suspended between flange portions 91*a*, 92*a* on both sides of a hat member 91 being a soft steel sheet and a hat member 92 being a high-tensile steel sheet. A height of the one-sided hat member 90 is 66.2 mm, a distance between outer end portions of the flange portions 91*a*, 92*a* is 102 mm, and a length of the one-sided hat member 90 (that is, a length of the flange portions 91*a*, 92*a*) is 600 mm. As for the soft steel sheet, a sheet thickness is 1.2 mm and main components of the steel sheet are C: 0.041 weight %, Si: 0.007 weight %, Mn: 0.16 weight %, P: 0.009 weight %, and S: 0.01 weight %, and as for the high-tensile steel sheet, a sheet thickness is 1.2 mm and main components of the steel sheet are C: 0.12 weight %, Si: 0.5 weight %, Mn: 2.0 weight %, P: 0.01 weight %, and S: 0.003 weight %.

Note that the soft steel sheet is a steel sheet called as the standards such as SPHC, SPHD, SPHE, SPCC, SPCD, SPCE, SPCCT, SPCEN, and the like in JIS. The soft steel sheet mentioned in the present application is not limited to the soft steel sheets defined by JIS and may be considered as a steel sheet whose strength is lower than that of a high-tensile steel sheet whose carbon content is 0.07% or more.

The welding was performed under welding conditions that a laser output was 4.5 kW, a focus position was on a surface of the upper steel sheet, and a diameter of a beam spot at the focus position was 0.5 mm. As in the example 2, as shown in FIG. 8B, circular beads with a 0.5 mm bead width and a 6 mm diameter were formed in order of 1→2→3→4, that is, they were formed in order from an end to an end of one of the flange portions on both sides and next were formed in order from an end to an end of the other. The second beads were circular beads concentric with the first beads and had a 5.5 mm diameter, and were formed, after the formation of the first beads, in order of 1→2→3→4 similarly to the first beads. An interval between positions of the beads (gravity centers thereof) was 20 mm. In this case, a twist angle was about 18° and was to such a degree as to become a problem when this one-sided hat member 90 was assembled to another member to be welded or fixed. Note that the definition of the twist angle is the same as that described in the example 2.

On the other hand, in a similar one-sided hat member 90, both when a plurality of first beads were successively formed and when a plurality of second beads were successively formed, the beads were each formed at a position except the closest welding position. In this case, welding deformation was suppressed and the twist angle was reduced to less than 1°, and improvement was made to such accuracy as to cause no problem when this one-sided hat member 90 was assembled to another member to be welded or fixed.

Example 4

Figure 10:
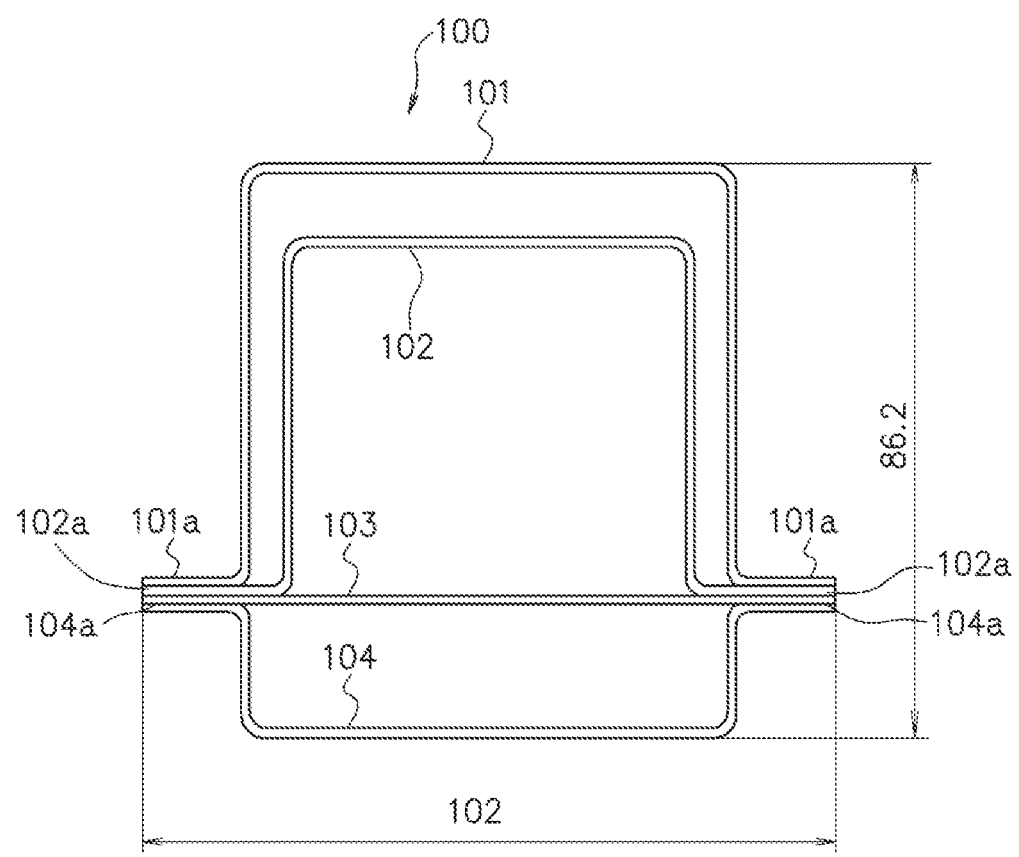
FIG. 10 is a front view showing a both-sided hat member of an example 4.

As shown in FIG. 10, a both-sided hat member 100 whose flange portions were composed of four stacked steel sheets was fabricated in such a manner that a flat sheet 103 being a high-tensile steel sheet was laser-welded so as to be suspended between flange portions 101a, 102a, 104a on both sides of hat members 101, 104 being soft steel sheets and a hat member 102 being a high-tensile steel sheet. A height of the both-sided hat member 100 is 86.2 mm, a distance between outer end portions of the flange portions 101a, 102a, 104a is 102 mm, and a length of the both-sided hat member 100 (that is, a length of the flange portions 101a, 102a, 104a) is 600 mm. As for the soft steel sheets, a sheet thickness is 1.2 mm and main components of the steel sheets are C: 0.041 weight %, Si: 0.007 weight %, Mn: 0.16 weight %, P: 0.009 weight %, and S: 0.01 weight %, and as for the high-tensile steel sheet, a sheet thickness is 1.2 mm and main components of the steel sheet are C: 0.12 weight %, Si: 0.5 weight %, Mn: 2.0 weight %, P: 0.01 weight %, and S: 0.003 weight %.

The welding was performed under welding conditions that a laser output was 5.0 kW, a focus position was on a surface of the upper steel sheet, and a diameter of a beam spot at the focus position was 0.5 mm. As in the example 2, as shown in FIG. 8B, circular beads with a 0.5 mm bead width and a 6 mm diameter were formed in order of 1→2→3→4, that is, they were formed in order from an end to an end of one of the flange portions on both sides and next were formed in order from an end to an end of the other. The second beads were circular beads concentric with the first beads and had a 5.5 mm diameter, and were formed, after the formation of the first beads, in order of 1→2→3→4 similarly to the first beads. An interval between positions of the beads (gravity centers thereof) was 20 mm. In this case, a twist angle was about 18° and was to such a degree as to become a problem when this both-sided hat member 100 was assembled to another member to be welded or fixed. Note that the definition of the twist angle is the same as that described in the example 2.

On the other hand, in a similar both-sided hat member 100, both when a plurality of first beads were successively formed and when a plurality of second beads were successively formed, the beads were each formed at a position except the closest welding position. In this case, welding deformation was suppressed and the twist angle was reduced to less than 1°, and improvement was made to such accuracy as to cause no problem when this both-sided hat member 100 was assembled to another member to be welded or fixed.

In the foregoing, the present invention is described with various embodiments, but the present invention is not limited to these embodiments and modifications and the like can be made within the scope of the present invention.

INDUSTRIAL APPLICABILITY

According to the present invention, since a laser-welded joint superior in joint strength to conventional ones is obtained and it is applicable to an automobile member or the like, its industrial applicability is great.

The invention claimed is:

1. A laser welding method, comprising:
providing, at a plurality of welding positions in an overlap portion of a plurality of members including a high-tensile steel sheet whose carbon content is 0.07 weight % or more, first beads in a closed loop shape or a shape having at least a first end and at least a second end, the first end facing the second end and defining one opening portion or more where a bead is not formed and in which a total length of the opening portion is ¾ of a circumcircle-equivalent diameter of the bead and second beads in a closed loop shape on inner sides of the first beads or a shape having at least a first end and at least a second end, the first end facing the second end and defining one opening portion or more where a bead is not formed and in which a total length of the opening portion is ¾ of a circumcircle-equivalent diameter of the bead are formed by remote laser welding for joining;
successively forming the plural first beads at all or some parts of the plural welding positions; and
successively forming the plural second beads for the plural formed first beads, wherein,
when successively forming the plural first beads and successively forming the plural second beads, each of the beads are formed at a position except the closest welding position among the plural welding positions.

2. The laser welding method according to claim 1, wherein, in the procedure for successively forming the plural second beads, the second beads are each formed for the first bead whose maximum temperature has become equal to or lower than an Ms point −50° C.

3. The laser welding method according to claim 2, wherein, in the procedure for successively forming the plural second beads, the second beads are each formed so that a temperature of the first bead becomes not lower than 400 degrees centigrade nor higher than an Ac1 point +50° C.

4. The laser welding method according to claim 1, wherein:
the shape of the first beads is circular and the shape of the second beads is circular and concentric with the first bead; and an angle made by a line connecting a center of the beads and starting and terminating ends of the first bead and a line connecting the center and starting and terminating ends of the second bead is 10° or more.

* * * * *

UNITED STATES PATENT AND TRADEMARK OFFICE
CERTIFICATE OF CORRECTION

PATENT NO. : 9,649,725 B2  
APPLICATION NO. : 13/823939  
DATED : May 16, 2017  
INVENTOR(S) : Seiji Furusako et al.

It is certified that error appears in the above-identified patent and that said Letters Patent is hereby corrected as shown below:

In the Specification

Columns 11-12, in Table 1, Comparative Example 4, third column from the right, change "320" to --<u>320</u>--.

Signed and Sealed this  
Eighth Day of May, 2018

Andrei Iancu  
*Director of the United States Patent and Trademark Office*